United States Patent
Setchell, Jr.

(10) Patent No.: US 6,501,850 B2
(45) Date of Patent: *Dec. 31, 2002

(54) METHOD FOR INCLUDING TRADITIONAL PHOTOGRAPHIC CALIBRATION INTO DIGITAL COLOR MANAGEMENT

(75) Inventor: John S. Setchell, Jr., Rochester, NY (US)

(73) Assignee: Eastman Kodak Company, Rochester, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/100,217

(22) Filed: Jun. 19, 1998

(65) Prior Publication Data

US 2002/0085749 A1 Jul. 4, 2002

Related U.S. Application Data

(60) Provisional application No. 60/073,671, filed on Feb. 4, 1998.

(51) Int. Cl.$^7$ ................................................. G06K 9/00
(52) U.S. Cl. ........................ 382/162; 358/523; 345/591
(58) Field of Search ................................. 382/162, 167; 358/516, 515, 524, 525, 500, 504, 527, 518, 521, 506, 523, 406, 1.9, 1.6, 520; 356/243; 345/431, 150, 154, 432, 589, 605; 708/290, 847; 347/19, 115, 172; 348/223, 254

(56) References Cited

U.S. PATENT DOCUMENTS

| | | | | |
|---|---|---|---|---|
| 5,481,380 A | * | 1/1996 | Bestmann | 358/504 |
| 5,521,723 A | | 5/1996 | Madden et al. | 358/501 |
| 5,537,516 A | | 7/1996 | Sherman et al. | 395/109 |
| 5,583,665 A | | 12/1996 | Gregory, Jr. et al. | 358/504 |
| 5,625,378 A | * | 4/1997 | Wan et al. | 345/150 |
| 5,644,509 A | | 7/1997 | Schwartz | 364/526 |
| 5,668,890 A | | 9/1997 | Winkelman | 382/167 |
| 5,754,448 A | * | 5/1998 | Edge et al. | 358/518 |
| 5,835,244 A | * | 11/1998 | Bestmann | 358/523 |

* cited by examiner

*Primary Examiner*—Jingge Wu
(74) *Attorney, Agent, or Firm*—David M. Woods

(57) ABSTRACT

A method for including photographic calibration into digital color management having an abstract color transformation profile, the method comprises the steps of measuring a density from a patch of an optically created image; inputting the measured densities to a computer workstation; computing a density to colorimetry matrix that is received by the computer workstation; and interpolating the matrix based on the inputted density for creating the abstract profile for ultimately permitting modification of an image manipulated by the abstract profile.

6 Claims, 3 Drawing Sheets

METHOD FOR INCLUDING TRADITIONAL PHOTOGRAPHIC CALIBRATION INTO DIGITAL COLOR MANAGEMENT

This Application claims the benefit of Ser. No. 60/073,671, filed Feb. 4, 1998.

APPENDIX

The disclosure in the appendix of this patent disclosure of this patent document contains material to which a claim of copyright protection is made. The copyright owner has no objection to the facsimile reproduction of any one of the patent documents or the patent disclosure, as it appears in the U.S. Patent and Trademark Office patent file or records, but reserves all other rights whatsoever.

FIELD OF THE INVENTION

The invention relates generally to the field of digital color management and, more particularly, to creating an abstract profile that digitally reproduces the color of an optically created image print on a digitally created print.

BACKGROUND OF THE INVENTION

In traditional photography, photoprocessing labs have a printing apparatus that optically creates prints. Typically, the film is passed under a light source so that the light passes through the film and onto printing paper for printing the image on the film onto the paper. A color filter is placed in the path of the light source for permitting adjustment of the color balance of the prints by an operator. The operator may then use this color adjustment on all future prints.

In contrast, in creating prints digitally, color transforms are used to adjust the colors in the prints. A digital printing system typically uses a series of devices each having its own color space for producing a print. Essentially, a color transformation makes a series of translations between each color space of the devices used in the color reproduction process for producing accurate and predictable color. A transform may also be used to modify the colors for creating aesthetically pleasing prints.

Although the presently known and utilized systems are satisfactory, they are not without drawbacks. Currently, the digital and optical systems function independently so that adjustments made in an optical system are used only in the optical system and vice versa. It is desirable to have the optical adjustments to be incorporated into the digital process for efficiency in the producing images. This would eliminate duplicating the digital adjustment for which an optical adjustment has already been made.

Consequently, a need exists for improvements for overcoming the above-described drawbacks.

SUMMARY OF THE INVENTION

The present invention is directed to overcoming one or more of the problems set forth above. Briefly summarized, according to one aspect of the present invention, the invention resides in a method for including photographic calibration into digital color management having an abstract color transformation profile, the method comprising the steps of: (a) measuring a density from a patch of an optically created image; (b) inputting the measured densities to a computer workstation; (c) computing a density to colorimetry matrix that is received by the computer workstation; and (d) interpolating the matrix based on the inputted density for creating the abstract profile for ultimately permitting modification of an image manipulated by the abstract profile.

The above and other objects of the present invention will become more apparent when taken in conjunction with the following description and drawings wherein identical reference numerals have been used, where possible, to designate identical elements that are common to the figures.

ADVANTAGEOUS EFFECT OF THE INVENTION

The present invention has the advantage of digitally reproducing images having modifications initially performed on an optically created image.

DETAILED DESCRIPTION OF THE INVENTION

In the following description, the present invention will be described in the preferred embodiment as a software program. Those skilled in the art will readily recognize that the equivalent of such software may also be constructed in hardware.

Still further, as used herein, computer readable storage medium may comprise, for example; magnetic storage media such as a magnetic disk (such as a floppy disk) or magnetic tape; optical storage media such as an optical disc, optical tape, or machine readable bar code; solid state electronic storage devices such as random access memory (RAM), or read only memory (ROM); or any other physical device or medium employed to store a computer program.

Before describing the invention in detail, it is beneficial to note that the present invention may be implemented on any general-purpose computer. Such computers are well known in the art and are not discussed herein for brevity. It also facilitates understanding to define output profile, input profile and abstract profile as used herein. In this regard, the International Color Consortium (ICC) was formed for defining international color standards, an ICC color profile format. This format defines an input profile as containing a transform relating code values from an input device such as a scanner to code values in a profile connection space (PCS), such as CIELAB. An abstract profile is defined such that its transformations begin and end at the PCS. An output device (printers and the like) profile contains transforms relating PCS values to device code values. It is also instructive to note that the ICC profiles are expressed in terms of colorimetry as defined by the Commission Internationale d'Eclairage (CIE), for example the aforementioned CIELAB. The PCS is defined as a device-independent color space, such as CIELAB.

Figure 1A:
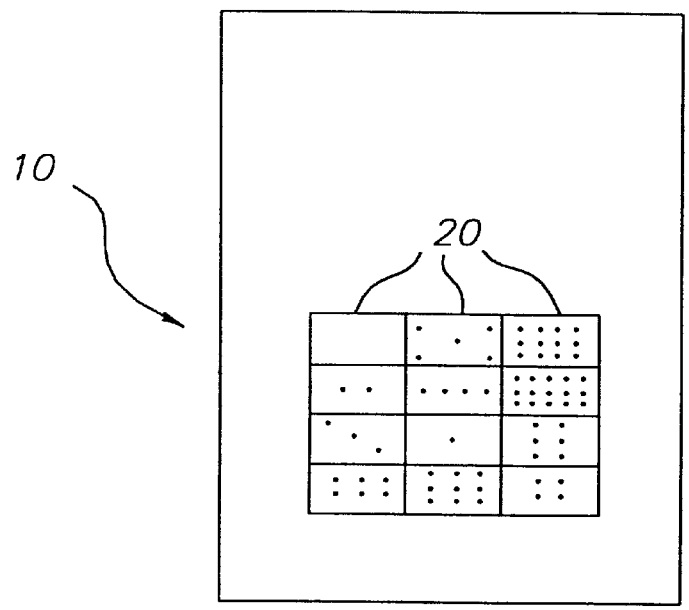
FIGS. 1A and 1B are front views of test images used in the present invention.

Referring to FIG. 1A, there is illustrated an optically created test image 10. The test image 10 is shown, for the purpose of illustrating a preferred embodiment, as having a plurality of patches 20 each having a different density. It is to be recognized that various modifications of the test image may be made without exceeding the scope of the invention, such as having only one patch 30 with only a single density (FIG. 1B), the patch or patches having various sizes and shapes, and modifications of similar import. The test image 10 may have been produced from an optical printing system in which a color adjustment was made by an operator so that the test image 10 contains the modification. Such optical printing systems utilize status A density as its unit of measurement, as is well known in the art.

Figure 1B:
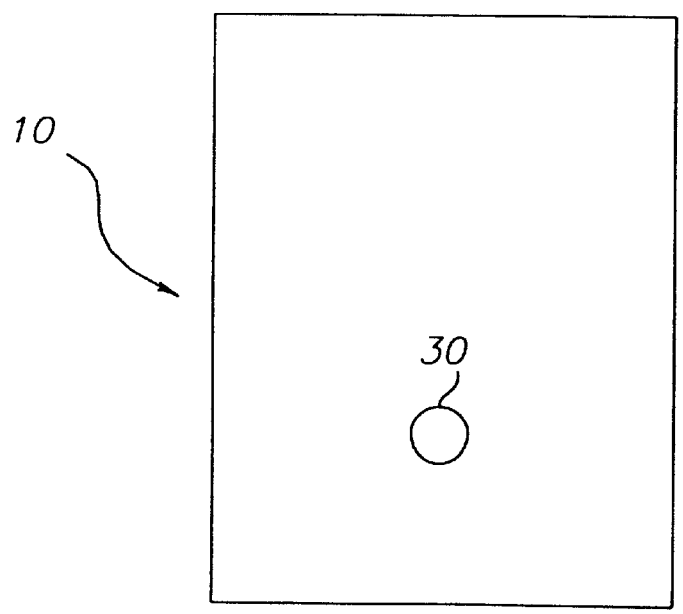
Figure 3:
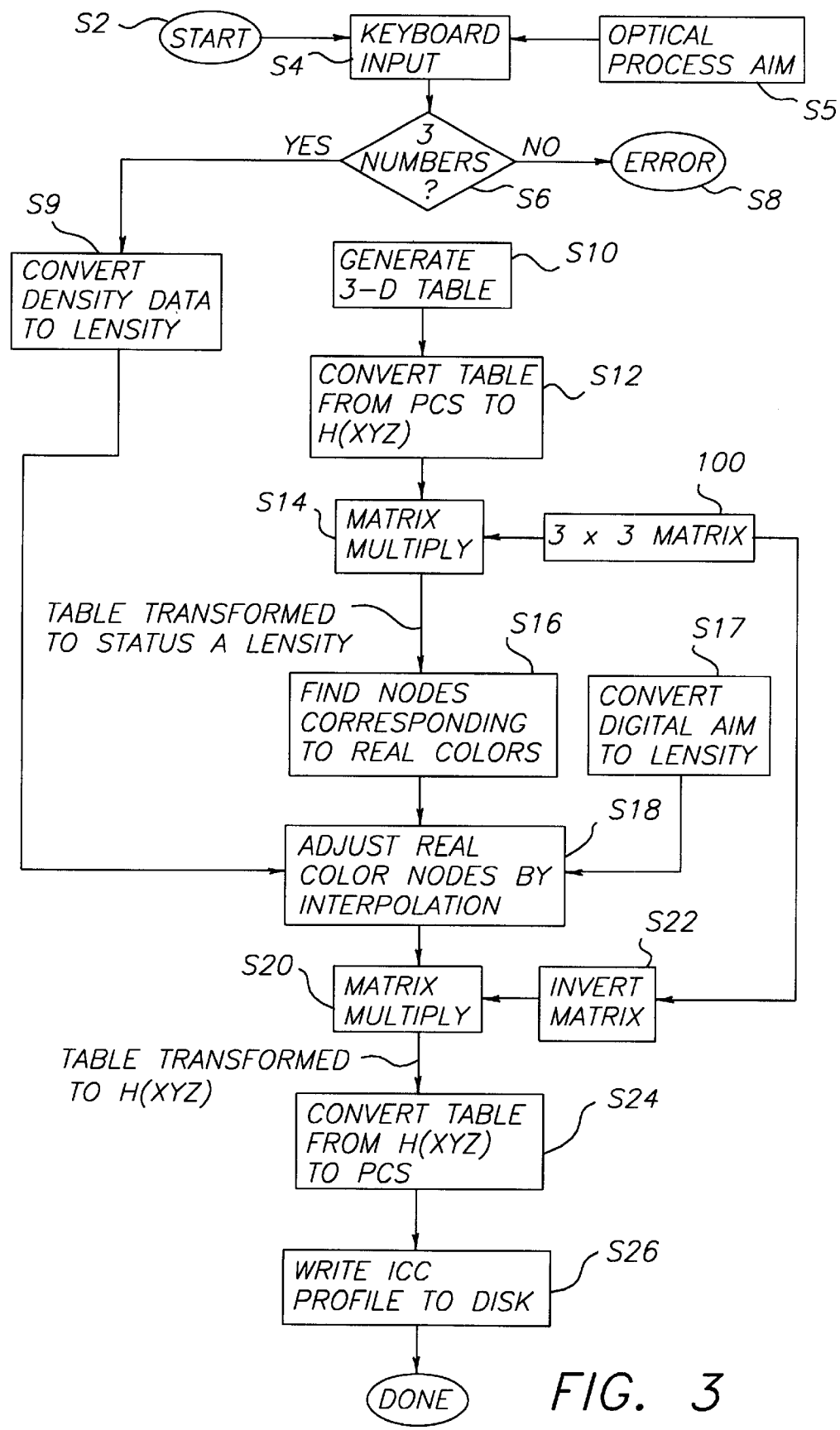
FIG. 3 is a flowchart illustrating the steps of a software program of the present invention.

Referring to FIG. 3, there is illustrated a flowchart representing a software program of the present invention which may be stored on any computer readable storage media. However, before discussing the flowchart in detail, it is instructive to briefly describe procedures that are done off-line, and are then either input to the software program or stored in memory for use by the software program. In this regard, a user uses a color measurement device (not shown), such as a densitometer, to digitally measure the tone scale and color balance of the mid-tone gray patch or patches of the test print (FIGS. 1A and 1B). If the test image 10 includes a plurality of patches, the densities are measured and input. The user inputs these digital values to the software program via a computer interface, such as a keyboard, as will be discussed in detail below. These values may alternatively be input into computer memory for retrieval and use by the software program. Typically, there will be three values—a red, green and blue value for each patch.

Figure 2:
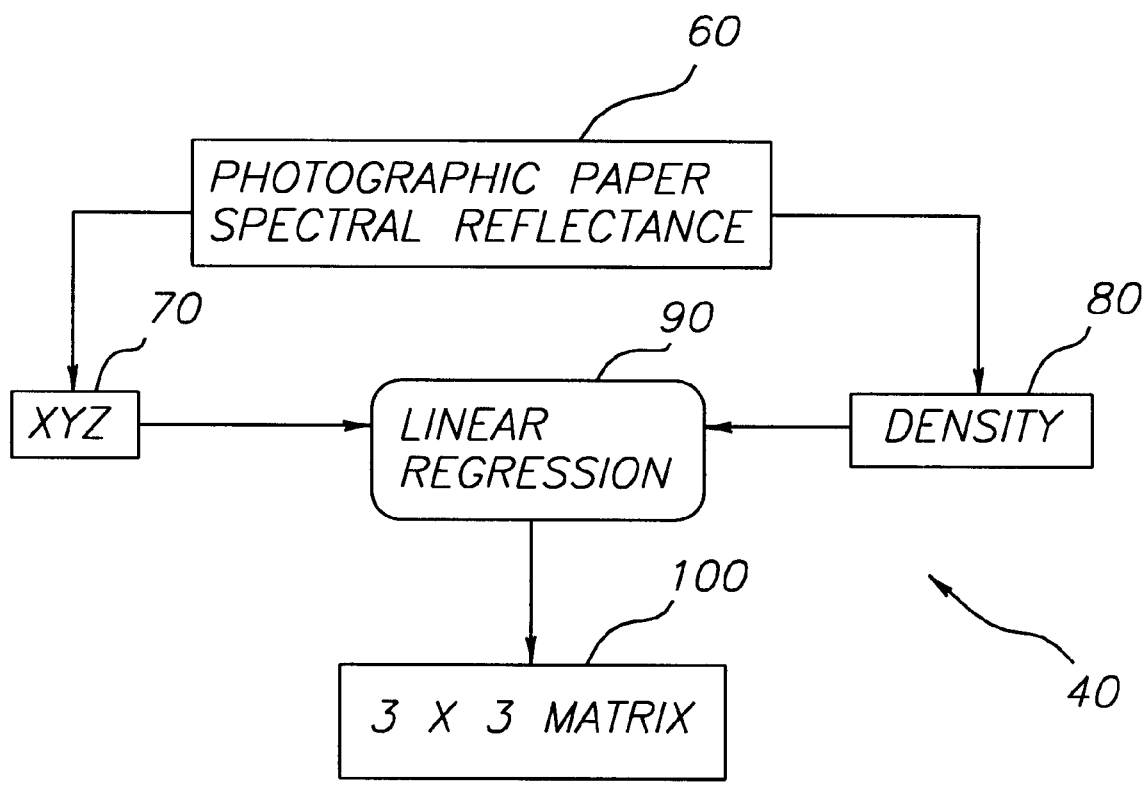
FIG. 2 is a flowchart of a process of the present invention for translating between density and colorimetry.

Referring to FIG. 2, in addition, a transform 40 between status A density and colorimetry is also created off-line. This transform 40 is computed empirically from spectrophotometric data on a particular paper 60 that represents the typical dye sets used in the photofinishing lab of interest. A series of several hundred patches of various colors spanning the achievable gamut are imaged onto the paper via a digital writing device. Colorimetric values 70 and density values 80 are then computed from the patches using standard techniques, such as ANSI CGATS.5-1993, sections 5.1 and 5.3. Both the colorimetry data 70 and the density data 80 are transformed to the CIE psychometric lightness function, such as $L^*$, which is applied to each of the X,Y,Z tristimulus values in turn, and a 3×3 matrix transformation (see appendix for preferred transformation values) translating the density function to the colorimetry function is computed using a least-squares regression technique 90. This 3×3 matrix 100 is stored in computer memory for future retrieval and use by the software program of the present invention.

Referring back to FIG. 3, the software program of the present invention is initiated S2 and the user is prompted to input S4 the density values of the test patch measured from the densitometer representing the process aim S5, as described hereinabove. If three density values are the preferred implementation S6, an error message S8 will be displayed on the computer monitor if three values are not input. These density values are converted to lensity S9 by a method that will be described below.

The software generates S10 a 3 dimensional table uniformly sampling the PCS. This table is now converted to the lightness function of each of the color channels S12, which is referenced hereinabove. The software transforms the table values to a density function by performing a matrix multiplication S14 using matrix 100. The particular function of density used herein is called lensity. Lensity is the psychometric lightness function of the antilogarithm of the negative density.

Values corresponding to physically realizable colors are the only table entries of interest for the purposes of this invention. These entries are identified in step S16 by selecting lensity values in the range of 0 to 100. The digital imaging process is considered to have been calibrated to a particular aim for the reproduction of neutrals, conveniently represented as density values for the particular gray patches. These density values are converted to the lensity metric in step S17 and become the abscissa for adjustment of the results of step S16 by interpolation, the values found in step S9 serving as the ordinate. The adjusted table values are now transformed back to colorimetry by multiplying S20 by the inverse S22 of the matrix 100. The colorimetry values are transformed to PCS by the inverse relationship S24 to that used in step S12. This table then becomes the central feature of the abstract profile that is saved S26 to a disk. Those skilled in the art will recognize that the abstract profile will include other elements, such as one-dimensional tables, a 3×3 matrix, various attribute information, and such elements are not discussed in detail herein because they are well known in the art.

The invention has been described with reference to a preferred embodiment. However, it will be appreciated that variations and modifications can be effected by a person of ordinary skill in the art without departing from the scope of the invention.

What is claimed is:

1. A method for including photographic calibration from a photographic process into digital color management having an abstract color transformation profile operative in a profile connection space, the method comprising the steps of:

(a) measuring density values from one or more density patches on a test image produced by the photographic process and which represents an optical process aim, thereby providing measured density data;

(b) providing a transform for transforming between density data and colorimetry data based on spectrophotometric data of a particular paper representative of typical dye sets used in the photographic process, wherein the transform is operative in a CIE psychometric lightness space;

(c) providing a 3-dimensional table having table values for uniformly sampling the profile connection space;

(d) converting the table values into a lightness function;

(e) transforming the table values into a density function using said transform provided in step (b);

(f) finding table values corresponding to physically realizable colors;

(g) adjusting the table values corresponding to physically realizable colors to the optical process aim by 1-D interpolation from a digital process aim using the measured density values from step (a);

(h) transforming the adjusted table values back to colorimetric values by using an inverse of said transform provided in step (b);

(i) transforming the colorimetric values to the profile connection space by using a relationship inverse to that used in step (d); and (j) saving the transformed colorimetric values as an abstract color transformation profile.

2. The method as claimed in claim 1 wherein the particular density function in step (e) is a psychometric lightness function of the antilogarithm of a negative density.

3. The method as claimed in claim 1 wherein the transform in step (b) is a 3×3 matrix transformation translating between density data and colorimetry data that is computed using a least squares regression technique.

4. A computer program product for including photographic calibration from a photographic process into digital color management having an abstract color transformation profile operative in a profile connection space, said computer program product comprising: a computer readable storage medium having a computer program stored thereon for performing the steps of:

(a) measuring density values from one or more density patches on a test image produced by the photographic process and which represents an optical process aim, thereby providing measured density data;

(b) providing a transform for transforming between density data and colorimetry data based on spectrophotometric data of a particular paper representative of typical dye sets used in the photographic process, wherein the transform is operative in a CIE psychometric lightness space;

(c) providing a 3-dimensional table having table values for uniformly sampling the profile connection space;

(d) converting the table values into a lightness function;

(e) transforming the table values into a density function using said transform provided in step (b);

(f) finding table values corresponding to physically realizable colors;

(g) adjusting the table values corresponding to physically realizable colors to the optical process aim by 1-D interpolation from a digital process aim using the measured density values from step (a);

(h) transforming the adjusted table values back to colorimetric values by using an inverse of said transform provided in step (b);

(i) transforming the colorimetric values to the profile connection space by using a relationship inverse to that used in step (d); and (j) saving the transformed colorimetric values as an abstract color transformation profile.

5. The computer program product as claimed in claim 4 wherein the particular density function in step (e) is a psychometric lightness function of the antilogarithm of a negative density.

6. The computer program product as claimed in claim 4 wherein the transform in step (b) is a 3×3 matrix transformation translating between density data and colorimetry data that is computed using a least squares regression technique.

* * * * *